Dec. 28, 1948.   J. MARTIN   2,457,252
BODY PROTECTING DEVICE FOR AIRCRAFT PERSONNEL
Filed Sept. 16, 1947   3 Sheets-Sheet 1

INVENTOR
JAMES MARTIN.
BY Worth Wade
ATTORNEY.

Dec. 28, 1948.  J. MARTIN  2,457,252
BODY PROTECTING DEVICE FOR AIRCRAFT PERSONNEL
Filed Sept. 16, 1947  3 Sheets-Sheet 3

INVENTOR
JAMES MARTIN
BY Worth Wade
ATTORNEY.

Patented Dec. 28, 1948

2,457,252

UNITED STATES PATENT OFFICE 2,457,252

BODY PROTECTING DEVICE FOR AIRCRAFT PERSONNEL

James Martin, Higher Denham, near Uxbridge, England

Application September 16, 1947, Serial No. 774,382
In Great Britain October 13, 1946

5 Claims. (Cl. 244—122)

This invention relates to a body protecting device for use in connection with the launching of a pilot or other person from an aeroplane in flight for the purpose of making a parachute escape drop therefrom. Such escape drops by parachute are usually the result of some emergency and may take place whilst the aeroplane is travelling at a very high speed, as for example when the aeroplane is in an uncontrolled dive or in a spin or otherwise acting erratically. In such circumstances the occupant endeavouring to leave the aeroplane will be subjected to very great air pressure against which he will be almost powerless. As a result there is considerable danger that he may be unable to get out of the cockpit or his harness or parachute may get caught up on some part of the aeroplane or he may be flung against and strike some part of the tailplane, rudder or fin or other part of the aeroplane, whereby he may be killed, or rendered incapable of taking the necessary action required to make a successful drop by parachute. In the specification of patent application Serial No. 638,762 is described an invention to enable the pilot or other occupant of an aeroplane to be launched from the cockpit or escape hatch in a controlled and orderly manner so as to avoid the risk of striking against or being caught up on any part of the aeroplane. The present invention comprises a device to protect the occupant against the effects of the air pressure to which he will be subjected during and just after he has escaped or been launched from the aeroplane. With high speed aeroplanes of the present day and of the future, the air pressure which will be met by the occupant on leaving the aeroplane will be so great that it is likely to seriously interfere with his breathing and may even crush his chest or other parts of the body. The object of the present invention is to provide effective protection for the vital organs and the body of the wearer against the harmful effect of such pressure.

The invention is particularly applicable to single seater high speed fighter aeroplanes and the occupant will therefore be referred to hereinafter as the pilot but it is to be understood that the invention is also applicable to larger aeroplanes having more than one occupant and the term "pilot" where appropriate may be deemed to include navigator, gunner, observer, passenger, or any other occupant of the aeroplane.

According to this invention a body protector is provided to cover and protect the vital organs and body of the pilot and means is provided to support and position this protector by the back of the pilot's seat so that when the pilot and his seat are launched from the aeroplane, the body protector will be correctly supported and located to afford the desired protection to the pilot.

In carrying the invention into practice the chest or body protector may comprise an arch-shaped plate of sheet metal or other suitable stiff or rigid material shaped to fit over the body of the pilot and having rearwardly directed side members adapted to engage and be supported by the back of the pilot's seat. Suitable spigots may be arranged between the protector plate and frame members of the pilot's seat to position and support the protector plate in the required position to afford the desired protection whilst permitting sufficient freedom of movement to the pilot so as not to interfere with his normal actions. Suitable spring loaded retaining means may be provided to hold the protector plate in position in a readily releasable manner both for getting into or out of the aeroplane or for leaving the seat after it has been launched for a parachute escape drop.

Suitable examples of the invention will now be described with reference to the accompanying drawings in which.

Figure 1:
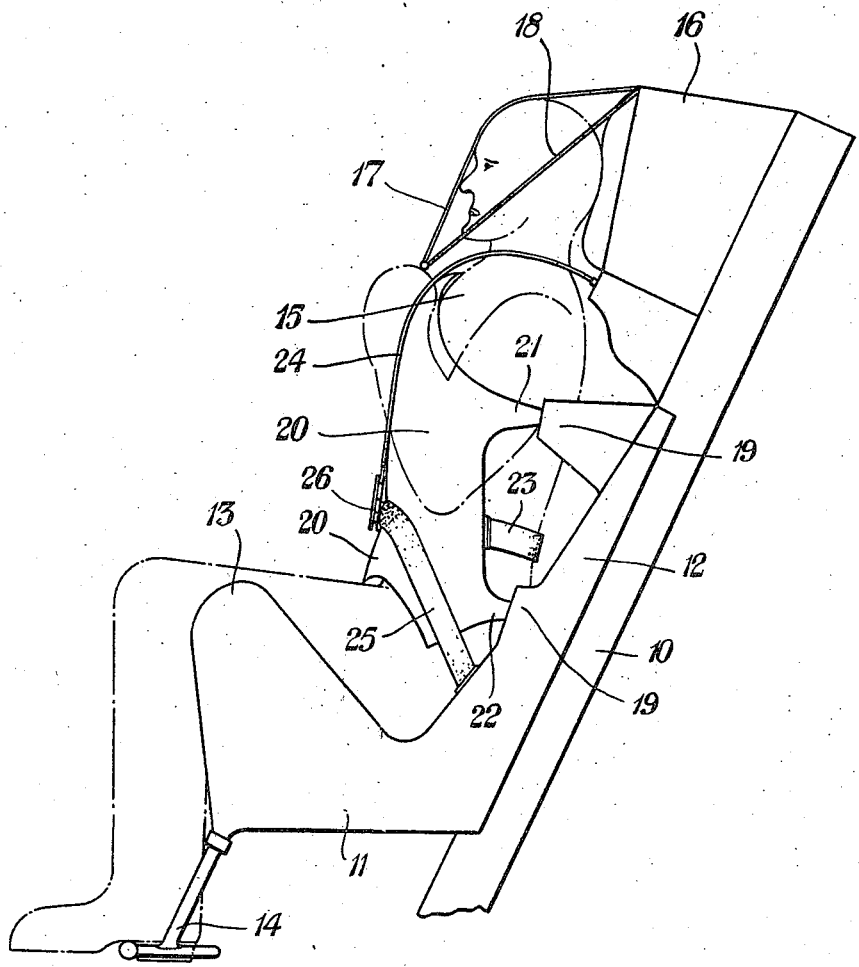
Fig. 1 is a diagrammatic side elevation of an ejection seat for launching with its occupant from an aeroplane and showing the body protecting device mounted in front of the body of the occupant and positioned and supported by the back of the seat.

In Fig. 1 the main frame of the ejection seat is represented at 10 and the actual seat 11 with seat back 12 and side protecting wings 13 is slidably mounted thereon so that the seat pan may be raised or lowered to suit short or tall occupants. The seat is provided with foot rests 14 to position and support the occupant's feet and legs during and after ejection from the aeroplane. The occupant 15 (shown in dot and dash lines) is seated in the seat with his feet on the foot rests 14 and his head resting against the padded front of a container 16 mounted on the main frame 10 of the ejection seat. In this container is packed the folded parachute by which the occupant of the seat will make the parachute descent after having been ejected from the aeroplane. The occupant's hands are grasping the handle attached to a face protecting screen 17 which has been drawn down to cover and protect his eyes, nose and mouth and to prevent his lungs from being inflated and injured by the pressure of air which will be met when he is ejected from the aeroplane. At least one cable 18 connects the handle of this screen to the actuating mechanism for ejecting the seat and occupant from the aeroplane.

The body protector 20 (which is the subject of this invention) comprises a light stiff cover plate of sheet material such as light metal alloy, steel or other suitable sheet material. This is shaped to fit loosely over the front of the body of the occupant of the seat and is supported clear of the body by the rearward extensions 21 and 22 at each side which engage against abutments 19 on the back 12 of the seat 11. The body protector 20 is secured to the wearer's body by the strap 23 which extends round his back. The seat harness straps 24 and 25 pass over the front of the body protector and the ends of all are secured in a common fastening device 26 which may be actuated to release them all simultaneously when required.

Figure 3:
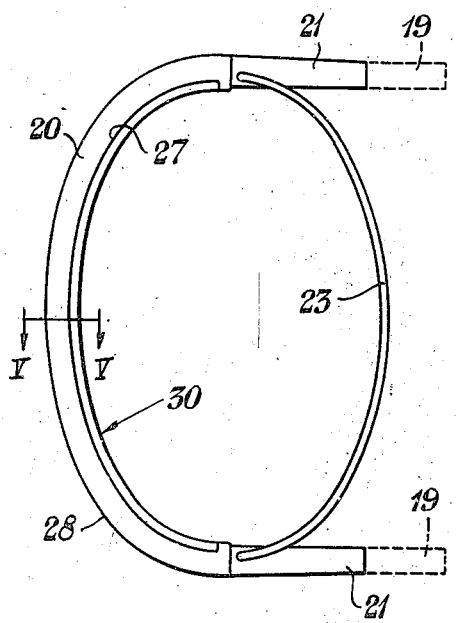
Fig. 3 is a plan view of the body protecting device shown in Fig. 1.
Figure 5:
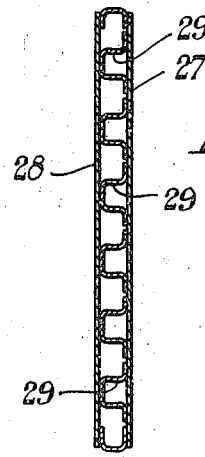
Fig. 5 is a fragmentary section on lines V-V of Fig. 3 showing the double skin construction of the body protecting device with internal reinforcement members.

The body protector 20 as shown in Figs. 3 and 5 is formed of an inner layer 27 and an outer layer 28 of sheet material bent and formed to the desired curved shape to fit over but clear of the body (indicated by the line 30) and internal stiffening strips 29 of channel section with out-turned flanges are arranged between and are secured to at least one of the two layers 27 and 28. This provides sufficient stiffness to prevent bending or flexing of the body protector so that the rearward extensions 21 and 22 engaging against abutments 19 on the back of the seat will hold the protector 20 clear of the body and protect it and the vital organs therein against the effect of the air pressure which will be met when the seat and its occupant are ejected from the aeroplane. The wings 13 at each side of the seat 12 will prevent the occupant's legs from being forced apart by the air pressure.

Figure 2:
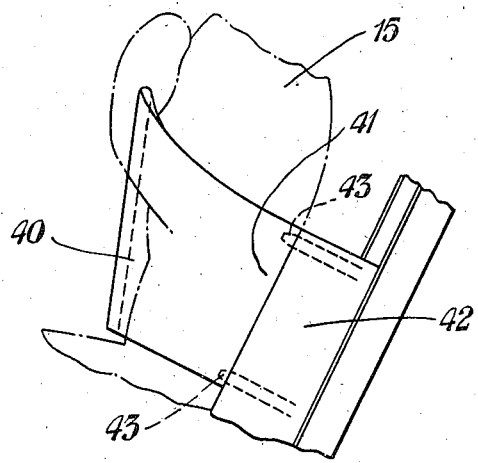
Fig. 2 is a fragment from a view similar to Fig. 1 and showing a modified form of body protecting device.
Figure 4:
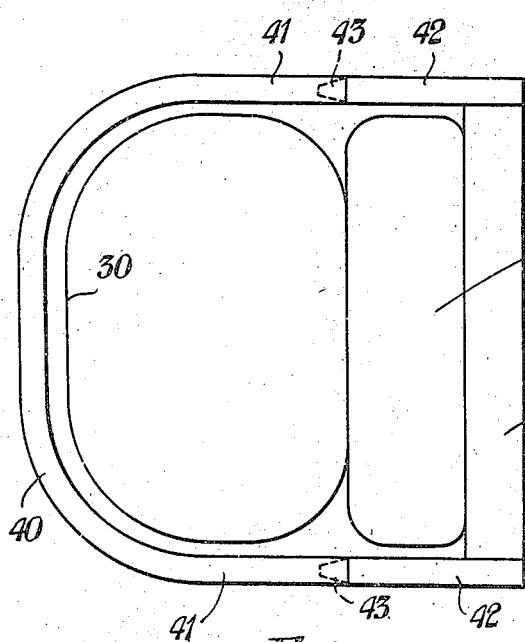
Fig. 4 is a plan view of the body protecting device shown in Fig. 2.

In Figs. 2 and 4 is shown a modified form of protector 40, the sides 41 of which extend rearwardly at each side of the body 30 to abut against forwardly projecting side members 42 of the back 12 of the seat and positioning spigots 43 may be arranged between them. The spigots 43 may act as spring catches to secure the protector 20 to the projecting sides 42 of the seat. The pack 44 in Fig. 4 represents a folded inflatable dinghy for use by the occupant of the seat if he should alight on water.

Figure 7:
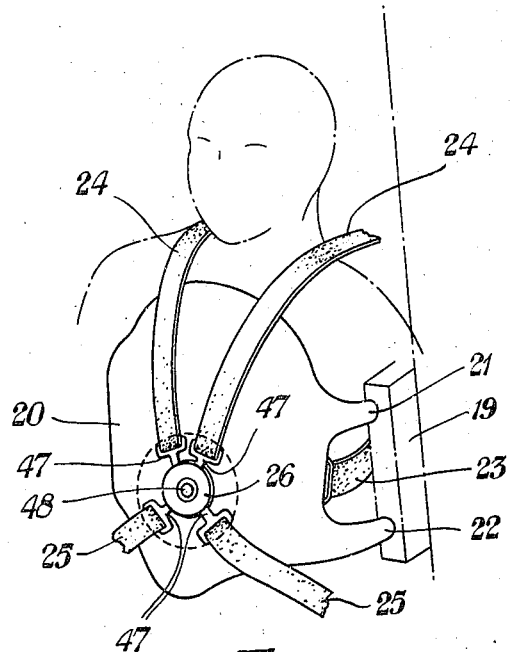
Fig. 6 is a vertical section through the body protecting device showing a modified construction and Fig. 7 is a fragmentary perspective view of the body protecting device and seat harness with quickly releasable device for securing the ends thereof.
Figure 6:
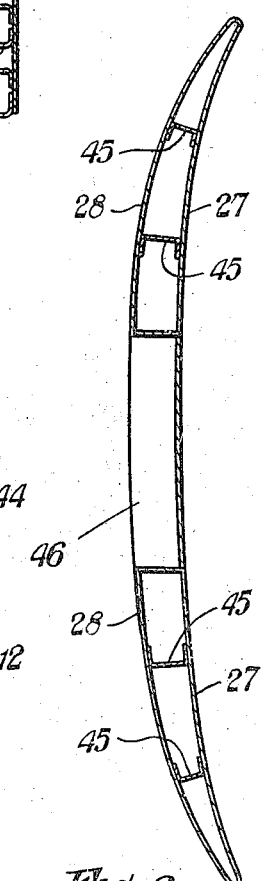

In Fig. 6 is shown a modified construction of the body protector 20 in which the inner layer 27 and outer layer 28 are connected at intervals by the internal stiffening strips 45 of channel section, the upper and lower edges being tapered off to a thinner section as shown. An opening is provided in the outer layer 28 to form the recess 46 in which may be accommodated the fastening device 26 for securing the ends of the seat harness straps 24 and 25. In Fig. 7 these straps 24 and 25 are each shown with a latch plate 47 the ends of which may be inserted into and secured in the drum-shaped fastening device 26. All the latch plates 47 and with them the strap ends may be simultaneously released by operating the centre knob 48 of the fastening device 26.

If desired the body protector 20 may be secured in position by the clothes or flying suit of the occupant of the seat and it may be embodied in the flying suit of a pilot but in all cases the rearward extensions 21 and 22 or the side members 41 are arranged to engage against and be supported by the abutments 19 and 42 respectively on the seat so that the body protector 20 will be supported by the seat, clear of the body so as to relieve the occupant of the seat from the pressure of the air which will be encountered if and when the seat with its occupant is launched from an aeroplane when in flight.

I claim:

1. A body protecting device for the personnel of aircraft comprising a cover plate shaped and adapted to fit over the front of the body and rearward extensions from the sides of the cover plate adapted to engage abutments on an ejection seat for launching from an aircraft and which support the cover plate free of the body of the occupant of the seat so as to protect the body and the vital organs therein from the pressure of the air which will be met if and when the seat with its occupant is launched from the aircraft in flight.

2. In a body protecting device according to claim 1, means for securing the cover plate over the front of the body of the user, upper and lower rearwardly directed extension at each side of the cover plate adapted to engage abutments on the back of the seat.

3. In a body protecting device according to claim 1, an inner and an outer layer of stiff sheet material spaced apart and connected by internal stiffening strips of channel section to prevent flexion of the cover plate by the air pressure.

4. In a body protecting device, a cover plate comprising inner and outer layers of stiff sheet material shaped to conform approximately to the contour of the body, shaped stiffening strips secured between the inner and outer layers, rearwardly directed side members adapted to engage against abutments on the back of the seat and a strap for securing the cover plate over the front of the body.

5. In a body protecting device according to claim 4, harness straps secured to the seat and extending over the cover plate, latch plates secured to the ends of each harness strap, a single fastening device into which all the latch plates may be inserted and a single releasing means by which all the latch plates may be simultaneously released.

JAMES MARTIN.

No references cited.